MAGNETIC TAPE APPARATUS

Filed Nov. 14, 1955 3 Sheets-Sheet 1

INVENTORS
JOHN F. SWEENY
DONALD E. REED
BY Flehr & Swain
ATTORNEYS

MAGNETIC TAPE APPARATUS

Filed Nov. 14, 1955 3 Sheets-Sheet 2

INVENTORS
JOHN F. SWEENY
DONALD E. REED
BY Flehr & Swain
ATTORNEYS

Nov. 24, 1959 J. F. SWEENEY ET AL 2,914,619

MAGNETIC TAPE APPARATUS

Filed Nov. 14, 1955 3 Sheets-Sheet 3

INVENTORS
JOHN F. SWEENY
DONALD E. REED

BY [signature]

ATTORNEYS

United States Patent Office 2,914,619
Patented Nov. 24, 1959

2,914,619

MAGNETIC TAPE APPARATUS

John F. Sweeney, Los Altos, and Donald E. Reed, Redwood City, Calif., assignors to Ampex Corporation, Redwood City, Calif., a corporation of California Application November 14, 1955, Serial No. 546,675

4 Claims. (Cl. 179—100.2)

This invention relates generally to magnetic tape machines of the type adapted for special playback operations.

It is sometimes desirable to reproduce short portions of a magnetic tape record successively, and at a relative speed between the tape and the magnetic head which differs from the speed with which the tape progresses between the supply and takeup reels. In conjunction with such successive scanning operations it is also desirable to provide electronics which reproduces a record track only for a portion of the scanning movement, and for which portion the relative rate of movement between the tape and the head is constant.

It is an object of the present invention to provide improved scanning means for apparatus of the above character, which will produce the desired relative movements between the tape and the magnetic head without undue tape tension or breakage.

Another object of the invention is to provide an improved electronic circuit for reproducing a portion of the scanned tape, and which incorporates novel blanking or gating means.

Additional objects and features of the invention will appear from the following description in which the preferred embodiment has been set forth in detail in conjunction with the accompanying drawings.

Referring to the drawings.

In general the present machine employs the usual rotatable turntables which are adapted to carry tape supply and takeup reels. The tape is guided to move across a magnetic head, and is engaged by capstan means which progresses the tape at a constant speed. The scanning means engages the tape adjacent both sides of the head, and includes a fulcrum lever driven by cam means. An electronic system connects with the head for reproduction, and special blanking means is used whereby reproduction is confined to a predetermined portion of the movement of the tape during a scanning cycle.

Figure 1:
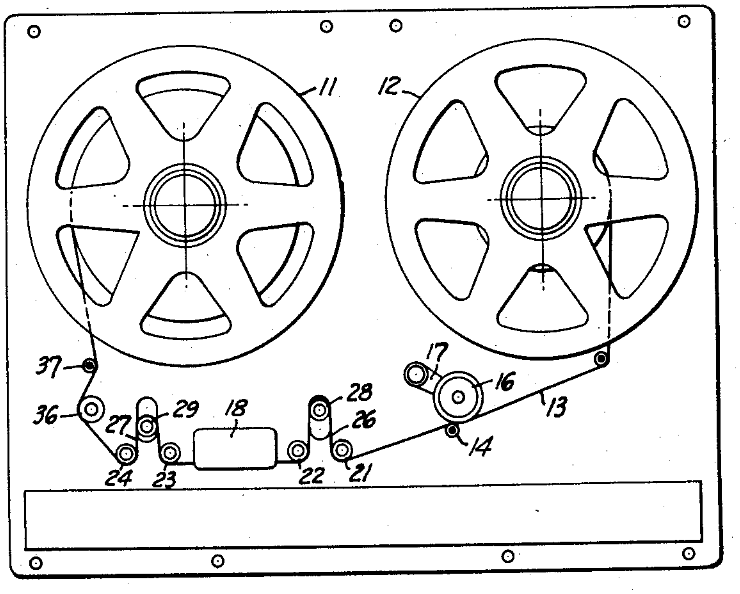
Figure 1 is a plan view schematically illustrating a machine incorporating the present invention.

The machine schematically illustrated in Figure 1 consists of supply and takeup reels 11 and 12, carried by conventional turntables. Suitable electrical motive means (not shown) are connected with each turntable whereby during a playback operation sufficient torque is applied to the turntable for reel 11 to maintain a desired tape tension, and whereby sufficient torque is applied to the turntable for the takeup reel to wind up the tape as it is fed by the driving capstan. The same motive means can be used for fast forward and rewind operations. Also suitable braking means (not shown) can be associated with the turntables to prevent tape slack during deceleration following fast forward and rewind operations.

That portion of the magnetic tape 13 extending between the reels is engaged by the driving capstan 14. This capstan is driven at a constant speed by suitable motive means (not shown). An idler 16, carried by the rotatable arm 17, serves to press the tape into frictional driving relationship with the periphery of the capstan 14 during playback operations. The magnetic head assembly 18 includes a suitable magnetic transducer unit of conventional construction, which may be adapted to either reproduce one or any number of a plurality of record tracks, as desired.

Figure 2:
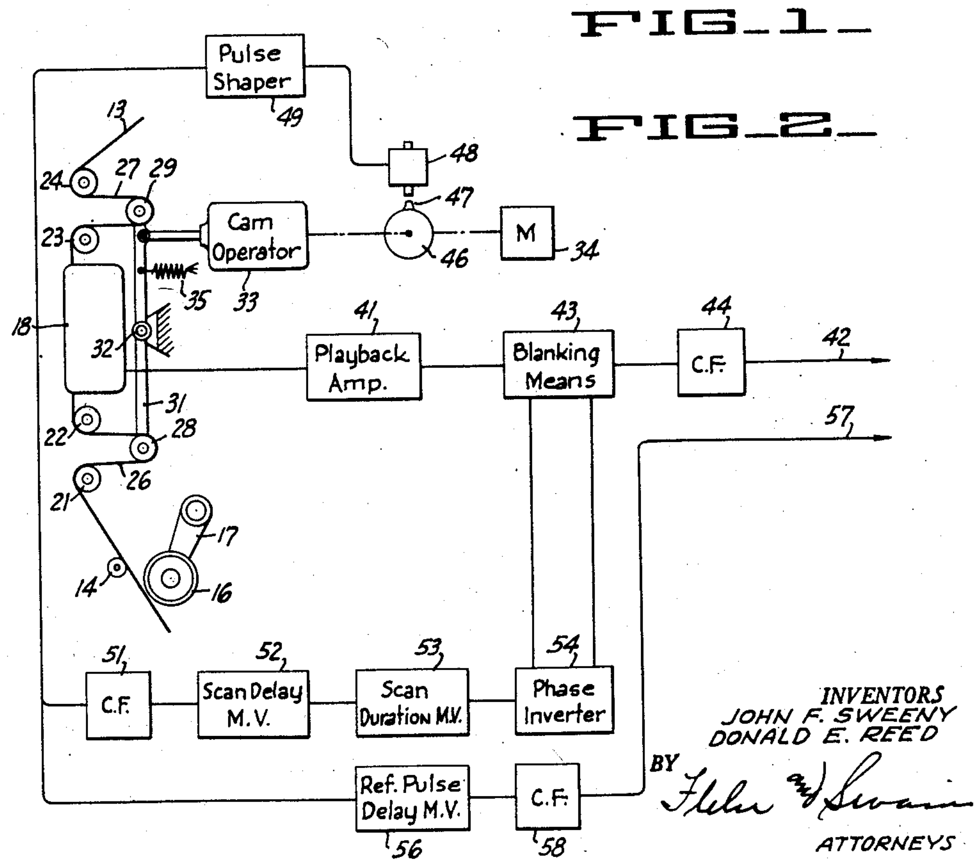
Figure 2 is a schematic view illustrating the scanning mechanism employed, together with the electronics.

Between the capstan 14 and the head assembly 18 the tape engages the fixed guides 21 and 22, which may be in the form of journaled rollers. Similar rollers 23 and 24 engage the tape at the other side of the head. The tape loops 26 and 27, which extend between the guides 21 and 22, and 23 and 24, engage the guide rollers 28 and 29 (Figure 2). These rollers are journaled upon the ends of the lever 31, which is fulcrumed at 32 for oscillating movement. Suitable cam operator 33 is provided for oscillating the lever 31, and this mechanism is driven by suitable means such as the motor 34. The lever may be loaded by a tension spring 35, whereby the cam roller or like mechanism incorporated in the operator 33 is maintained in contact with an associated cam surface.

Between the roller 24 and the supply reel 11 the tape is engaged by a roller 36 and the tape tensioning member 37. Roller 36 is connected to a rotatable fly wheel (not shown) that tends by its inertia to cause the roller 36 and the associated portion of the tape to move at a relatively constant speed. The tensioning member 37 is connected to suitable spring loading means (not shown) which yieldably urges it against the tape.

Operation of the machine as described above is as follows: During normal playback operation the tape is pressed against the capstan 14 by the idler 16, and therefore is driven at a constant speed, or at any one of several constant speeds that may be selected by the operator. That portion of the tape coming off the supply reel 11 also moves at a relatively constant speed, due to frictional engagement with the roller 36. Continuous oscillation of the lever 31 by the cam operator 33 serves to extend and retract the tape loops 26 and 27 alternately. As a result that portion of the tape adjacent the magnetic head 18 is caused to move relative to the head in alternately forward and reverse directions, and at rates of movement independent of the speed with which the tape is driven by the capstan 14.

Figure 3:
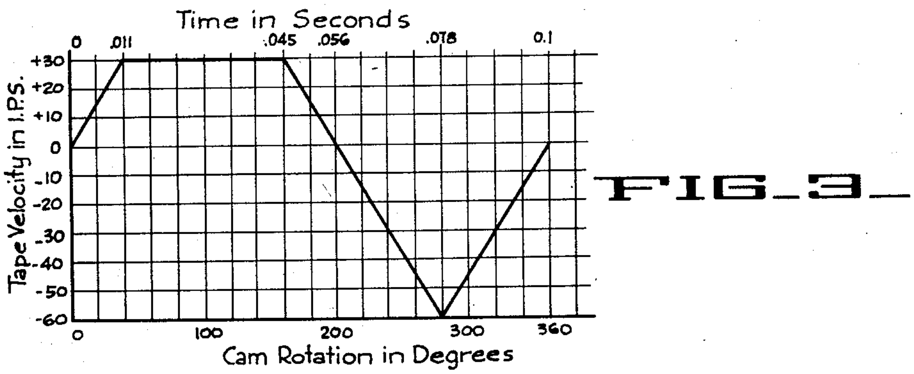
Figure 3 is a graph illustrating the type of cam mechanism for operating the scanner.

By way of example, in one particular instance the cam operator was constructed by use of a simple cam rotating through 360° for each complete scanning cycle, and the cam surface and associated parts were constructed to give speeds as illustrated in Figure 3. The graph of this figure was plotted between cam rotation in degrees on the horizontal axis, and tape velocity in inches per second on the vertical axis. The capstan drive in this instance was constructed to provide any selected one of a plurality of predetermined tape speeds, as for example either three or six inches per second. In plotting the graph of Figure 3 the speed of movement of the tape as applied by the capstan, was ignored. The straight horizontal portion of this graph represents an interval where the tape speed or velocity remains constant. It is this portion of the complete cycle of movement that is employed for reproduction.

A block diagram of the electronics is shown in Figure 2. The magnetic head 18 is connected through suitable switching means (not shown) with the playback amplifier 41, the output of which is applied to the output lead 42 through the blanking means 43 and cathode follower 44. Pulse generating means is associated with the cam operator 33, and can consist of the rotatable member 46 having a projecting magnetic portion 47 adapted to sweep past the magnetic pickup 48. The resulting pulse from the pickup 48 is applied to the pulse shaper 49, to provide sharp negative pulse of proper characteristics for multivibrator triggering.

The triggering pulse from the shaper 49 is applied through cathode follower 51 to the multivibrator 52. This multivibrator is of the monostable type, having its circuit components proportioned to provide either a predetermined or adjustable time delay (i.e. interval) between the instant of triggering and its return to stable state. This multivibrator can be referred to as a scan delay multivibrator. The output of multivibrator 52 is used to trigger the so-called scan duration multivibrator 53. Multivibrator 53 is likewise of the monostable type which when triggered passes to unstable and then back to stable state. Its circuit components are so selected as to provide either a predetermined or adjustable time interval between the instant of triggering by an applied pulse, and the return of the multivibrator to stable state.

The output of the scan duration multivibrator 53 is applied to the phase inverter 54 to provide a balanced output for application to the blanking means 43.

In addition to the electronic arrangement described above it is frequently desirable to provide a reference pulse of predetermined position. Thus an additional multivibrator 56, which can be termed a reference pulse delay multivibrator, has its input connected to the pulse shaper 49. This multivibrator is likewise of the monostable type having its circuit components adjusted to provide an interval between triggering and restoration to stable state, which bears either a predetermined or adjustable relationship to the blanking period. The output lead 57 connects with the multivibrator 56 through cathode follower 58.

Any suitable means can be connected to the output leads 42 and 57, such as visual means of the oscilloscope type.

Figure 4:
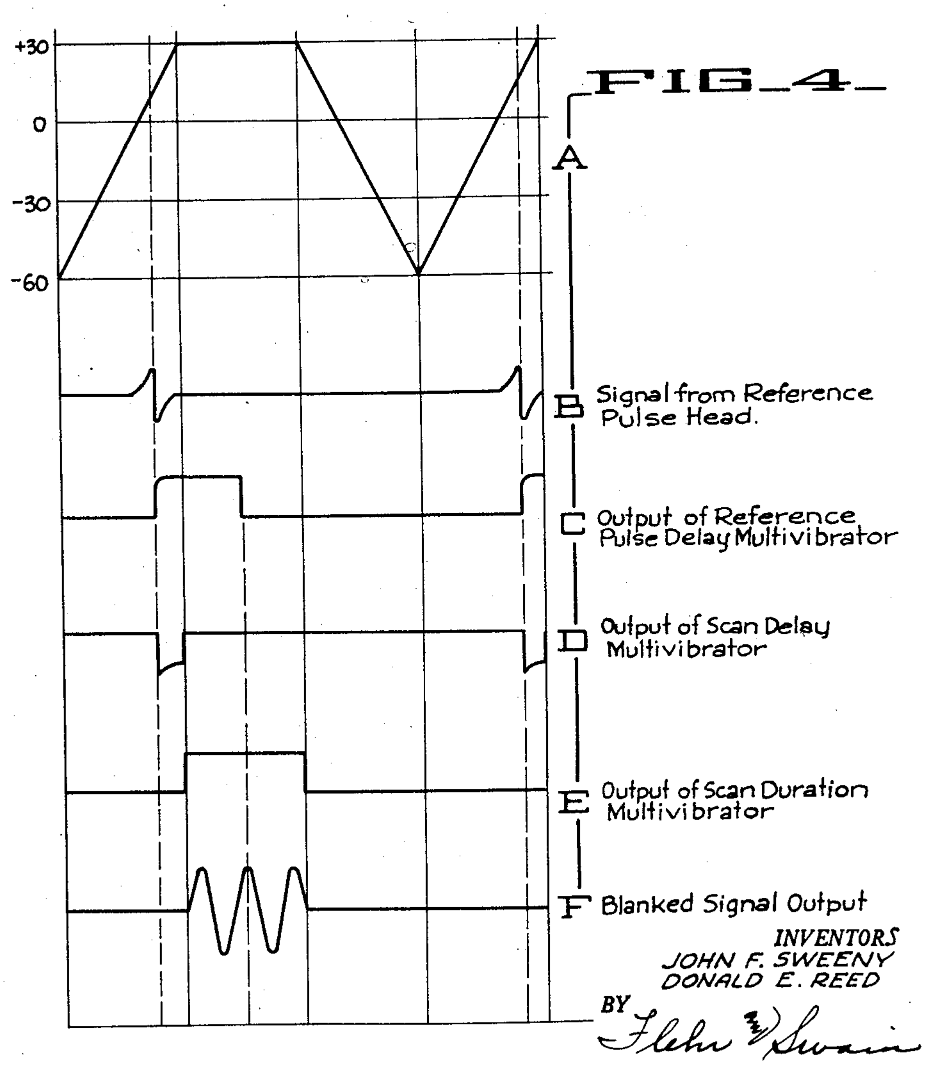
Figures 4A, 4B, 4C, 4D, 4E and 4F are related graphs serving to illustrate the tape motion and the operation of the electronics.

Operation of the system shown in Figure 2 can be best explained by reference to the graphs of Figures 4A–4F inclusive. All of these graphs were plotted for the particular machine previously mentioned by way of example. The graph of Figure 4A is similar to Figure 3, and is plotted between tape velocity on the vertical axis and time on the horizontal axis. The time of one complete scanning cycle is assumed to be 0.1 seconds. The graph of Figure 4B represents the signal from the pickup 48 before shaping. From this pulse the shaping means derives a sharp negative pulse suitable for multibivrator triggering. The graph of Figure 4C represents the output of the reference delay multivibrator 56. The graph of Figure 4D represents the output of the scan delay multivibrator 52. The graph of Figure 4E represents the output of the scan duration multivibrator 53. The graph of Figure 4F represents a blanked signal output.

It is evident from Figures 4A–4F that signal is received at the output lead 42 only during periods when the signals are not blanked out by the output of the scan duration multivibrator 53. Likewise in this instance the termination of the pulse from the reference pulse delay multivibrator 56 corresponds with the midpoint of the period during which the signal is received. The signal is effectively received only for a portion of the tape movement.

It will be evident that with the system of Figure 2 the tape is being progressed at a constant speed by the capstan, and during such tape progression, the signal from overlapping portions of the record are repetitively reproduced for display and analysis.

Figure 5:
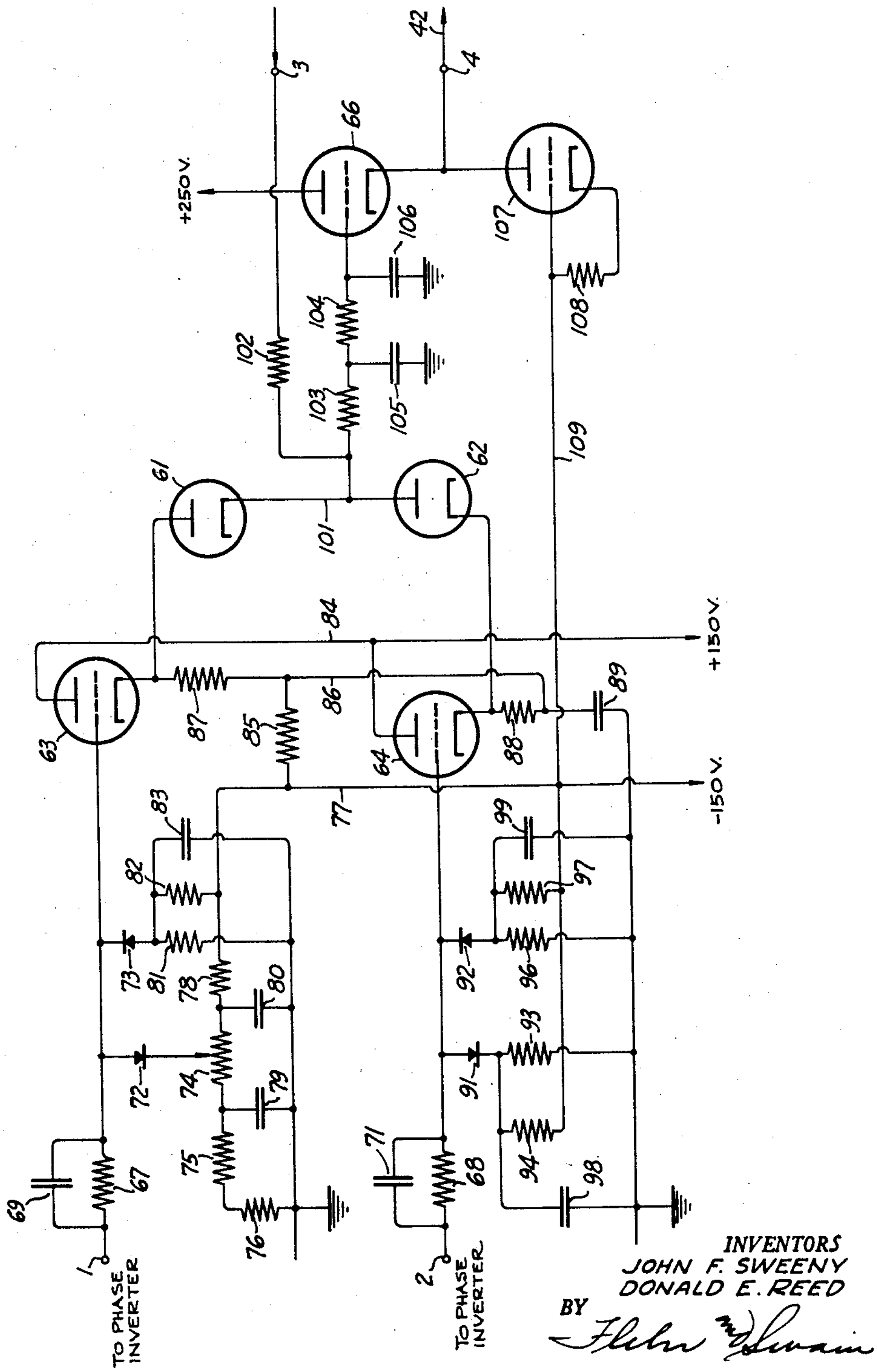
Figure 5 is a circuit diagram illustrating suitable blanking or gating means.

The novel blanking means shown in Figure 5 makes use of diodes 61 and 62, in conjunction with the cathode follower tubes 63 and 64. The terminals 1 and 2 are coupled to the phase inverter 54. Input terminal 3 is connected to the output of the playback amplifier 41, and terminal 4 connects with the cathode follower 44 and thte output lead 42. Tube 66 functions as the cathode follower 44.

The terminals 1 and 2, which can be coupled to the phase inverter through suitable capacitors, connect with the control grids of the tubes 63 and 64 through the isolating resistors 67 and 68, which are shunted by the condensers 69 and 71. The grids of tubes 63 and 64 are also connected to diode clipping means and voltage dividers. The clipping means for tube 63 consists of diode clippers 72 and 73, which connect from the grid lead to a voltage divider that includes a potentiometer 74, having its adjustable contact connected to diode 72. One terminal of this potentiometer connects to ground through resistors 75 and 76, and the other terminal connects with the negative bias lead 77, through the series resistor 78. Suitable bypass condensers 79 and 80 are connected as indicated. One side of diode 73 connects to ground through resistor 81, and to the lead 77 through resistor 82. Resistor 81 is also shunted by condenser 83.

The plates of the tubes 63 and 64 connect to the common lead 84, which extends to a source of plate potential, such as the +150 volts indicated. The lead 77 connects with the negative side of the plate +150 v., as indicated, and also connects with the cathodes of tubes 63 and 64, through the common resistor 85, lead 86 and the separate resistors 87 and 88. Bypass condenser 89 connects between lead 86 and ground.

The clipping and voltage divider means associated with the grid lead of tube 64, includes the clipping diodes 91 and 92. One side of diode 91 connects through resistor 93 to ground, and through resistor 94 with the lead 77. One side of diode 92 connects to ground through resistor 96, and with the lead 77 through resistor 97. Bypass condensers 98 and 99 are also provided. It will be evident that the two voltage dividing means such as described determine the biasing of the tubes 63 and 64.

The anode of blanking diode 61 connects directly with the cathode of tube 63, and the cathode of diode 62 connects directly with the cathode of tube 64. A lead 101 directly connects the cathode of tube 61 with the anode of tube 62, and this lead also connects with the input terminal 3, in series with the resistor 102. The grid of the cathode follower tube 66 connects with lead 101 through a low pass filter formed by the series resistors 103 and 104, and the condensers 105 and 106. The biasing of tube 66 is controlled by the vacuum tube 107. The plate of this tube connects with the cathode of tube 66 and the output terminal 4, and control grid and cathode (connected together through cathode resistor 108) connect with the lead 109 and from thence with the −150 v.

With the circuit described above it will be evident that the two diodes 61 and 62 are in effect connected in shunt with the cathode resistors for the cathode follower tubes 63 and 64. When the tubes 61 and 62 are biased to be conducting, terminal 3 is effectively short circuited or grounded, thus preventing input signal from being applied to the output terminal 4. However when diodes 61 and 62 are nonconducting, input signal is applied to the grid of the cathode follower 66, with the result that signal output is applied to terminal 4.

In general two signals 180° out of phase are applied to the terminals 1 and 2 from the phase inverter 54. When the signal at the plate of the phase inverter swings to its most positive potential, the voltage applied to the anode of diode 61 is most positive. At the same time the voltage at the cathode of the inverter is at its most negative value, and therefore the cathode of diode 61 is at its most negative value. Clipping voltages determined by the voltage dividers associated with the clipping diodes, are proportional so that the voltage at the plate of tube 61 is positive with respect to the voltage at the cathode of tube 62, and therefore both the diodes are made conducting. At this time the cathode follower tubes 63 and 64 become in effect two cathode followers with a common cathode resistor. The voltage at such common cathode resistor depends primarily on the voltage of the more positive grid of the two tubes 63 and 64, which in this instance is the grid of tube 63. Therefore the voltage level during blanking is determined by the voltage on the grid of tube 63, and this can be adjusted by changing the setting of potentiometer 74. Assuming that diodes 61 and 62 are conducting, input applied from terminal 3 passes through a voltage divider including resistor 102 and the two diodes. However since these diodes are of low impedance, the signal is greatly attenuated or blanked out. During the unblanked portion of the cycle the voltages applied to the diodes 61 and 62 are reversed, and therefore the diodes are made nonconducting. Thus under such conditions the signal from the input terminal 3 is applied to the grid of tube 66 without attenuation.

The blanking circuit described above has a number of desirable features. It avoids troublesome transients at the beginning and end of the blanking interval. Also it makes it possible to adjust for zero signal during the blanking portion of the cycle. Thus voltage excursions and transients during blanking are avoided.

In one particular instance, the circuit of Figure 5 was constructed with components as follows: The respective values of the various resistors were: 67, 27K (where K equals 1,000 ohms); 74, 500 ohms (between terminals); 75, 270 ohms; 76, 1K; 78, 27K; 81, 12K; 82, 150K; 85, 4.7K; 87, 33K; 88, 33K; 93, 10K; 94, 150K; 96, 15K; 97, 150K; 68, 27K; 102, 270K; 103, 68K; 104, 150K; 108, 1K. The respective values of the various condensers were: 67, 39 mmfd.; 71, 39 mmfd.; 79, 250 mfd.; 80, 250 mfd.; 83, 25 mfd.; 98, 25 mfd.; 99, 250 mfd.; 89, 20 mfd.; 105, 20 mmfd.; 106, 7 mmfd. The clipping diodes 72, 73, 91, and 92 employed were known by manufacturer's specifications as No. 1N67A germanium diodes. The vacuum tubes 63 and 64 were tubes known by manufacturer's specifications as No. 12AU7. The diodes 61 and 62 were two halves of a vacuum tube known by manufacturer's specifications as No. 6AL5. The tubes 66 and 107 were two halves of a vacuum tube known by manufacturer's specifications as No. 12AT7. The leads 77 and 84 were connected respectively to −150 and +150 volts, as indicated in Figure 5.

We claim:

1. In magnetic tape apparatus, rotatable turntable means adapted to carry supply and takeup tape reels, a magnetic head adapted to be engaged by a portion of the length of the tape extending between the reels, capstan means for driving the tape at a constant speed and serving to draw the tape past the head, and scanning means for causing periodic scanning movements of that portion of the tape adjacent the head in alternate forward and reverse directions, said last means comprising spaced stationary tape guide means adjacent each of the two ends of the head, means engaging two loops of the tape extending between the guide means, and motive means for alternately extending and retracting such loops to thereby move said portion of the tape relative to the head in alternately forward and reverse directions.

2. Magnetic tape apparatus as in claim 1 in which said scanning means serves to move the tape past the head at a constant velocity for a substantial portion of the complete movement.

3. Magnetic tape apparatus as in claim 1 in which said means for engaging loops consists of a pivoted lever having tape engaging means on its extremities.

4. Apparatus as in claim 2 together with electronic means connected to the magnetic head for reproducing a record track, and blanking means associated with said electronic means whereby the record track is reproduced only during said portion of the tape movement.

References Cited in the file of this patent

UNITED STATES PATENTS

| | | |
|---|---|---|
| 1,045,905 | Stilwell | Dec. 3, 1912 |
| 2,591,088 | Millman et al. | Apr. 1, 1952 |
| 2,609,457 | Thurm | Sept. 2, 1952 |
| 2,614,215 | Karp et al. | Oct. 14, 1952 |
| 2,648,589 | Hickman | Aug. 11, 1953 |
| 2,713,618 | McNabb | July 19, 1955 |
| 2,751,438 | Baer | June 19, 1956 |
| 2,778,634 | Gams et al. | Jan. 22, 1957 |
| 2,814,676 | House | Nov. 26, 1957 |